United States Patent [19]
Glaser et al.

[11] Patent Number: 5,911,075
[45] Date of Patent: Jun. 8, 1999

[54] QUERY SELECTION FOR A PROGRAM DEVELOPMENT ENVIRONMENT

[75] Inventors: Howard Justin Glaser; Mary C. Lehner, both of San Jose, Calif.

[73] Assignee: International Business Machines Corporation, Armonk, N.Y.

[21] Appl. No.: 08/828,479

[22] Filed: Mar. 31, 1997

[51] Int. Cl.$^6$ .................................................. G06F 17/30
[52] U.S. Cl. .................. 395/704; 395/705; 395/706; 395/707; 707/2; 707/4; 707/101; 707/102; 707/104
[58] Field of Search .................................. 707/101, 102, 707/104; 345/705, 706, 707, 709, 704

[56] References Cited

U.S. PATENT DOCUMENTS

| | | | |
|---|---|---|---|
| 5,168,441 | 12/1992 | Onarheim et al. | 364/146 |
| 5,179,698 | 1/1993 | Bachman et al. | 707/4 |
| 5,193,182 | 3/1993 | Bachman et al. | 707/100 |
| 5,193,183 | 3/1993 | Bachman | 707/1 |
| 5,195,178 | 3/1993 | Krieger et al. | 345/347 |
| 5,241,645 | 8/1993 | Cimral et al. | 395/500 |
| 5,249,300 | 9/1993 | Bachman et al. | 707/104 |

OTHER PUBLICATIONS

Lewis et al., "Code Generators", IEEE Software, vol. 7, No. 3, May 1990, pp. 67–70.
Kim et al., "A Temporal Database Management Main Memory Prototype", Proceedings of The 1994 IEEE Region 10's Ninth Annual International Conference. Theme: Frontiers of Computer Technology, Singapore, Aug. 22–26, 1994, pp. 391–396.
Anonymous, "Sheridan Intros "Sp_Assist"for SQL Databases", Newsbytes, Aug. 29, 1995.
Shumate, "Tool Provides Assistance in Developing C/S Apps (Sheridan Software Systems Inc's sp_Assist 1.08 Code Generating Tool)", PC Week, vol. 13, No. 7, Feb. 19, 1996, pp. 67–69.
Butler, "Following Procedure. (Sheridan Software Systems Inc. Sp_Assist) (Windows 95 Specail Section)", Windows Sources, vol. 3, No. 10, Oct. 1995, p. 210.
Lintz, "Examiner's Exhibit A: Selected Output from sp_Assist (Version 4.0 Build 1381, Service Pack 3; Sep., 1996) Demonstration Program Downloaded From http://www.shersoft.com", May 18, 1998, pp. 1–5.

Primary Examiner—Paul R. Lintz
Attorney, Agent, or Firm—Merchant, Gould, Smith, Edell, Welter & Schmidt

[57] ABSTRACT

A programming development environment that supports the development of Internet and Intranet applications.

15 Claims, 10 Drawing Sheets

QUERY SELECTION FOR A PROGRAM DEVELOPMENT ENVIRONMENT

CROSS-REFERENCE TO RELATED APPLICATIONS

This application is related to the following co-pending and commonly-assigned patent applications:

Application Ser. No. 08/828,854, entitled "PROGRAMMING DEVELOPMENT ENVIRONMENT FOR INTRANET AND INTERNET APPLICATIONS EMPLOYING UNIQUE PROJECT DATA STRUCTURE," filed Mar. 31, 1997, by Daniel E. House, Brian J. Owings, and Shiau-Shiau Pei.

Application Ser. No. 08/828,476, entitled "SHARED OBJECT MODEL," filed on Mar. 31, 1997, by Brian J. Owings, Shiau-Shiau Pei, and Daniel E. House.

Application Ser. No. 08/828,480, entitled "REMOTE SCRIPTING OF LOCAL OBJECTS," filed Mar. 31, 1997, by Daniel E. House, Constance J. Nelin, and Rebecca B. Nin.

Application Ser. No. 08/828,989, entitled "METHOD AND APPARATUS FOR SIMULATING A MULTI-TIERED COMPUTER ENVIRONMENT," filed on Mar. 31, 1997, by Daniel E. House and Constance J. Nelin.

Application Ser. No. 08/829,478, entitled "MULTI-TIER VIEW PROJECT WINDOW," filed on Mar. 31, 1997, by Howard J. Glaser, Daniel E. House, and Constance J. Nelin.

Application Ser. No. 08/828,104, entitled "EXTENDER USER INTERFACE," filed on Mar. 31, 1997, by Thomas E. Conrad, Howard J. Glaser, Jean C. Ho, James L. Keesey, Constance J. Nelin, and Gerold J. Wilmot.

Application Ser. No. 08/828,846, entitled "SHARED MODULES GRAPHICAL USER INTERFACE," filed on Mar. 31, 1997, by Howard J. Glaser, Daniel E. House, and Constance J. Nelin.

Application Ser. No. 08/828,477, entitled "DOCKING AND FLOATING MENU/TOOL BAR," filed on Mar. 31, 1997, by Howard J. Glaser, Stewart E. Nickolas, and Karl D. Johnson.

Application Ser. No. 08/828,890, entitled "HTML INTEGRATION UTILITY FOR A PROGRAM DEVELOPMENT ENVIRONMENT," filed on Mar. 31, 1997, by Howard J. Glaser.

Application Ser. No. 08/828,897, entitled "EXTENDER SMART GUIDE," filed on Mar. 31, 1997, by Howard J. Glaser.

Application Ser. No. 08/828,481, entitled "MULTI-TIER DEBUGGING," filed on Mar. 31, 1997, by Daniel E. House and Constance J. Nelin; and Application Ser. No. 08/828,990, entitled "DYNAMIC DISCOVERY OF CONTROLS," filed on Mar. 31, 1997, by Daniel E. House and Constance J. Nelin;

all of which applications are incorporated by reference herein.

BACKGROUND OF THE INVENTION

1. Field of the Invention

This invention relates in general to programming development environments performed by computers, and in particular, to the use of a programming development environment for Internet and Intranet applications 2. Description of Related Art With the fast growing popularity of the Internet and Intranets, especially Web-based networks, there is also a fast growing demand for Internet and Intranet access to databases. However, it is especially difficult to use relational database management system (RDBMS) software with Web-based networks. One of the problems with using RDBMS software with Web-based networks is the lack of programming development environments that can be used to develop both Web-based and RDBMS-based applications.

For example, Web-based networks operate using the HyperText Transfer Protocol (HTTP) and the HyperText Markup Language (HTML). HTTP is the protocol used by Web clients and Web servers to communicate between themselves using these hyperlinks. HTML is the language used by Web servers to create and connect together documents that contain these hyperlinks. This protocol and language results in the communication and display of graphical information that incorporates hyperlinks. Hyperlinks are network addresses that are embedded in a word, phrase, icon or picture that are activated when the user selects a highlighted item displayed in the graphical information.

In contrast, most RDBMS software uses a Structured Query Language (SQL) interface. The SQL interface has evolved into a standard language for RDBMS software and has been adopted as such by both the American Nationals Standard Organization (ANSI) and the International Standards Organization (ISO).

Thus, there is a need in the art for methods of accessing RDBMS software across an Internet or Intranet, and especially via Web-based networks. Further, there is a need for simplified development environments for such systems.

SUMMARY OF THE INVENTION

To overcome the limitations in the prior art described above, and to overcome other limitations that will become apparent upon reading and understanding the present specification, the present invention discloses a method, apparatus, and article of manufacture for providing a programming development environment that supports the development of Internet and Intranet applications. More specifically, the present invention discloses a mechanism that allows visual selection and insertion of SQL queries into a computer program such as an application script. This results in embedded SQL commands within the application script that communicate with a relational database management system.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention comprises a computer-implemented Rapid Application Development (RAD) tool for constructing client-server applications for a three tier computer network architecture. The RAD tool provides an Integrated Development Environment (IDE) that is used to design, develop, deploy, and debug computer programming that accesses and displays data quickly and easily on the three tier computer network. Moreover, the RAD tool is extremely easy to use, yet powerful.

The RAD tool of the present invention is primarily targeted to enterprise customers. The fact that an application is produced quickly does not mean that the application is non-critical. The applications constructed using the RAD tool are primarily oriented towards data access, data manipulation and data rendering, especially in conjunction with relational database management systems (RDBMS).

Hardware Environment

Figure 1:
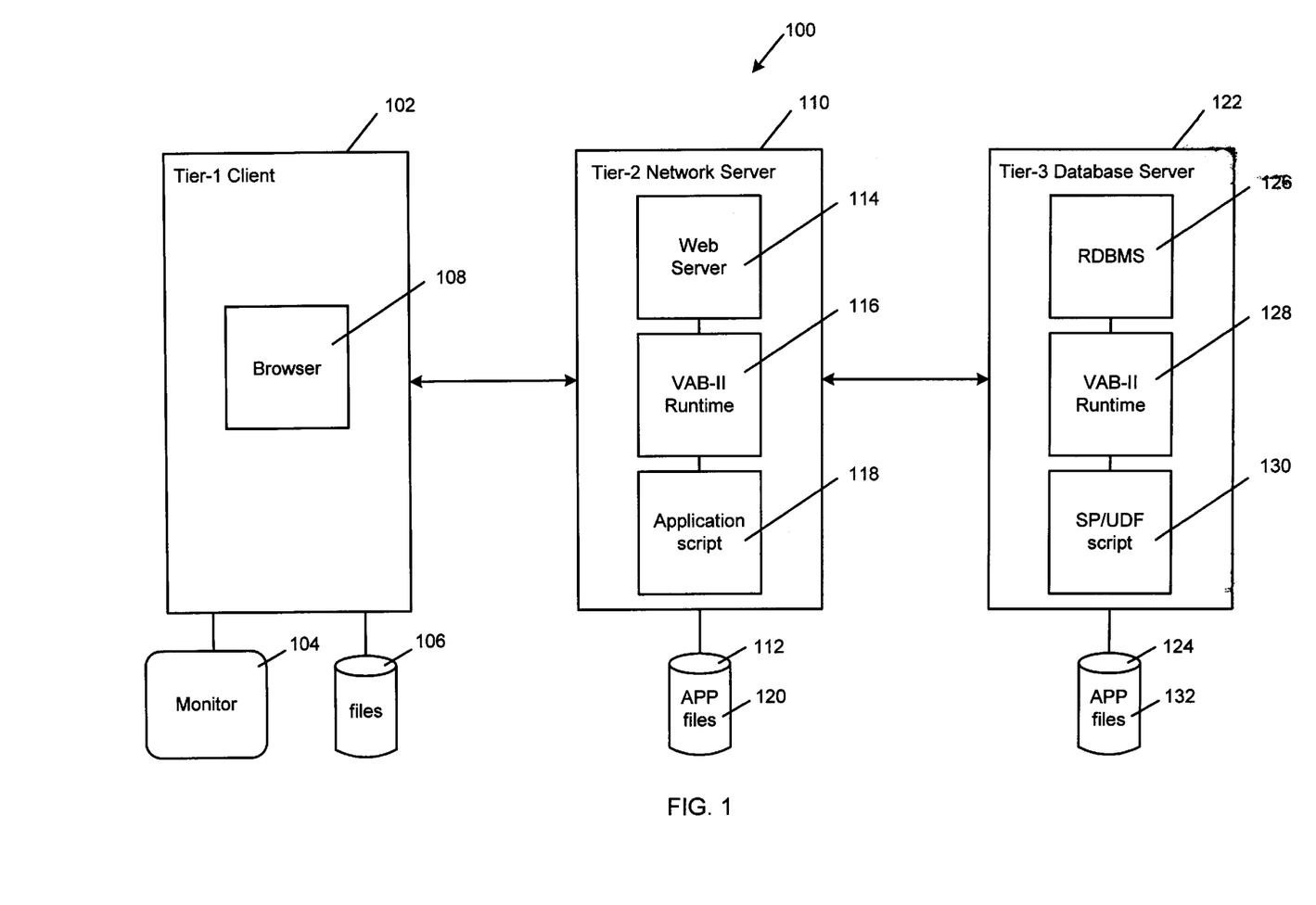
FIG. 1 is a block diagram that illustrates the three tier architecture of the present invention.

FIG. 1 is a block diagram that illustrates the three tier architecture 100 of the present invention. Each of the three tiers shown may be executed on separate computer hardware platforms as shown in FIG. 1, or on a single computer hardware platform, or in some combination thereof.

The first tier comprises a client computer 102 having a monitor 104 and one or more data storage devices 106. In the preferred embodiment, the client computer 102 executes a browser 108 capable of containing and executing applets, such as Microsoft Internet Explorer or Netscape Navigator. The browser 108 communicates with programs on other tiers through HTTP (Hypertext Transfer Protocol).

The second tier comprises a network server 110 having one or more data storage devices 112. In the preferred embodiment, the network server 110 executes a plurality of computer programs including a web server 114, a persistent VAB-II runtime module 116, and one or more application scripts 118 retrieved from an APP file 120 stored on a data storage device 112. The web server 114 (such as IBM, Microsoft, or Netscape HTTP daemons) communicates with the browser 108 and the third tier via HTTP. The VAB-II runtime module 116 executes the application scripts 118 and communicates with the third tier. The application scripts 118 (such as LotusScript scripts) can contain programming logic for communicating with both the browser 108 and the third tier. Preferably, the application scripts 118 include Basic programming instructions, Java, ActiveX, or DLL applet controls, embedded SQL, and other mechanisms known in the art.

The third tier comprises a database server 122 having one or more data storage devices 124 connected thereto. In the preferred embodiment, the database server executes a plurality of computer programs including a relational database management system (RDBMS) 126, a persistent VAB-II runtime module 128, and Stored Procedure (SP) and User Defined Function (UDF) scripts 130 retrieved from an APP file 132 stored on a data storage device 124. The RDBMS 126 (such as IBM's DB2 product) receives requests either directly from tier-2 and/or indirectly from tier-2 via the VAB-II runtime module 128, and then performs the desired database functions. The VAB-II runtime module 128 executes the SP/UDF scripts 130. The SP/UDF scripts 130 comprise programming logic for accessing the database via the RDBMS 126 and communicating with the tier-2 computer programs.

Figure 2:
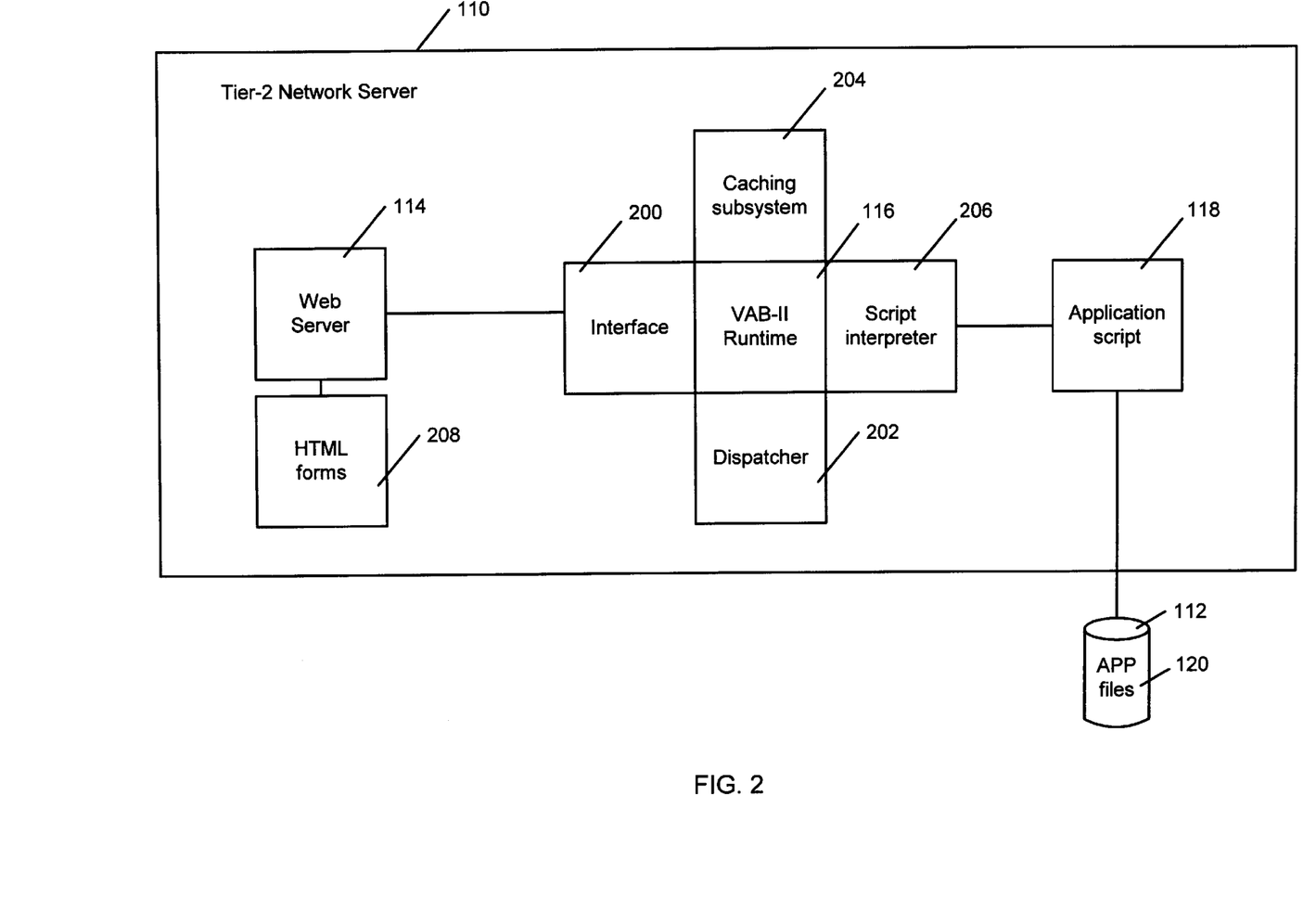
FIG. 2 is a block diagram that further illustrates the components of the network server in the present invention.

FIG. 2 is a block diagram that further illustrates the components of the network server 110 in the present invention. The VAB-II runtime module 116, for example, includes an interface 200 to the web server 114, a dispatcher 202, a caching subsystem 204, and a script interpreter 206 for executing one or more application scripts 118 retrieved from one or more APP files 120 stored on a data storage device 112. The interface 200 takes input from the web server 114 via a Common Gateway Interface (CGI), Netscape Server API (NSAPI), Internet Connection Server API (ICAPI), or some other protocol, and converts it to a form for use by the dispatcher 202. The dispatcher 202 then allocates a thread of the VAB-II runtime module 116 to each incoming request to run the desired application script 118. The caching subsystem 204 exists to help manage special purpose object persistence. The script interpreter 206 executes the application script 118 retrieved from the APP file 120 stored on a data storage device 112.

Figure 3:
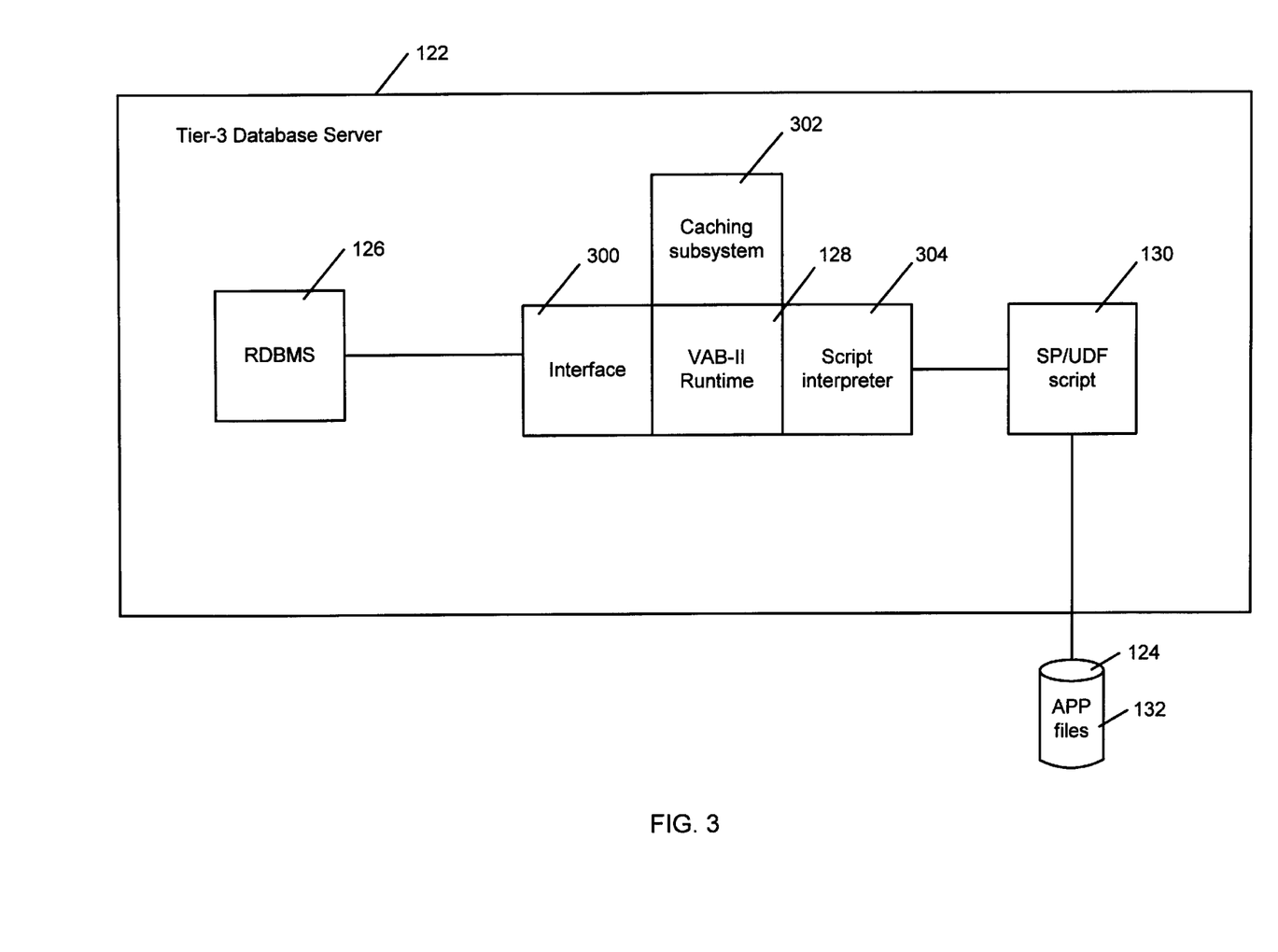
FIG. 3 is a block diagram that further illustrates the components of the database server in the present invention.

FIG. 3 is a block diagram that further illustrates the components of the database server 122 in the present invention. The VAB-II runtime module 128, for example, includes an interface 300 to the RDBMS 126, a caching subsystem 302, and a script interpreter 304 for executing one or more SP/UDF scripts 130 retrieved from one or more APP files 132 store on the data storage device 124. No dispatcher is required for the VAB-II runtime module 128 in the database server 122. The interface 300 provides a mechanism for invoking the database server 126 from the VAB-II runtime module 128 via a dynamic link library (DLL) or some other protocol. As in the network server 110, the caching subsystem 302 exists to help manage special purpose object persistence, although SP/UDF scripts 130 are generally not persistent. The script interpreter 304 executes the SP/UDF script 130 retrieved from the APP file 132.

As indicated above, the computer programs of the three tiers shown may be executed on separate computer hardware platforms or on a single computer hardware platform 134 or in some combination thereof. Each of the computers may each include, inter alia, one or more processors, memory, keyboard, or display, and may be connected locally or remotely to fixed and/or removable data storage devices and/or data communications devices. Each of the computers in each of the tiers also could be connected to other computers via the data communications devices.

Development Environment

Figure 4:
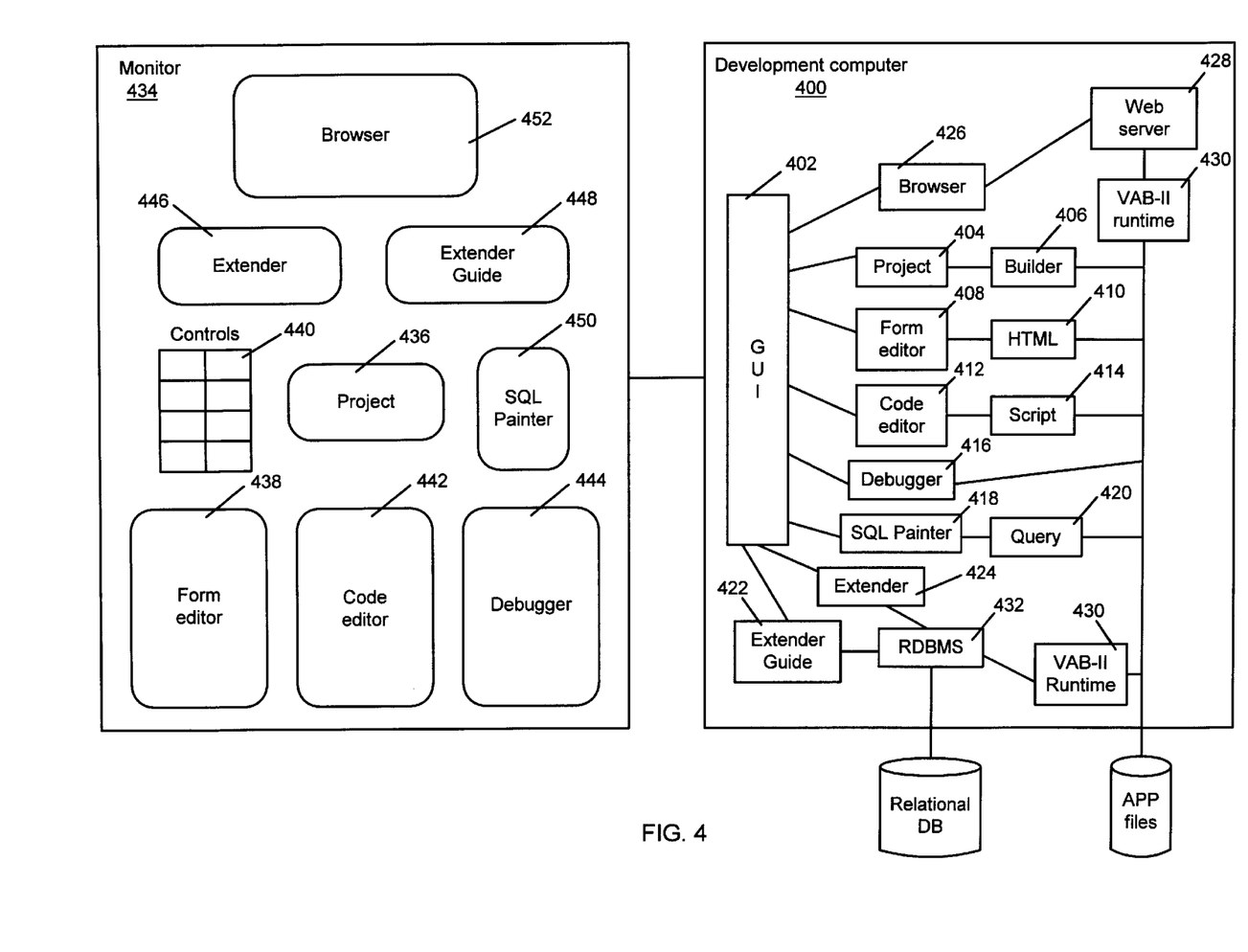
FIG. 4 is a block diagram that illustrates the development environment of the present invention.

FIG. 4 is a block diagram that illustrates the development environment of the present invention. A development computer 400 executes a Rapid Application Development (RAD) tool comprised of a number of different computer programs or modules, including a graphical user interface (GUI) 402, project manager 404 and associated builder 406, form editor 408 for constructing HTML forms 410, code editor 412 for constructing scripts 414, debugger 416, SQL painter 418 for constructing queries 420, RDBMS extender guide 422, and RDBMS extender user interface 424, as well as a browser 426, web server 428, VAB-II runtime module 430, and RDBMS 432. The RAD tool displays a user interface on a monitor 434 attached to the development computer 400, which includes, inter alia, a project window 436, form editor window 438, control pad 440, code editor window 442, debugging window 444, extender user interface window 446, extender guide window 448, SQL painter window 450, as well as a browser window 452.

As described above, the present invention is typically implemented using a plurality of computer programs, each of which executes under the control of an operating system, such as OS/2, Windows, DOS, AIX, UNIX, MVS, etc., and causes the development computer 400 to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs and operating system are comprised of instructions which, when read and executed by the development computer 400, causes the computer 400 to perform the steps necessary to implement and/or use the present invention. Under control of the operating system, the computer programs may be loaded from memory, data storage devices, and/or data communications devices into the memory of the development computer 400 for use during actual operations.

Those skilled in the art will recognize many modifications may be made to this configuration without departing from the scope of the present invention. For example, those skilled in the art will recognize that any combination of the above components, or any number of different components, peripherals, and other devices, may be used with the present invention.

SQL Queries

The present invention discloses a mechanism that allows visual selection and insertion of SQL queries into an application script 414. On the development computer 400, this results in embedded SQL commands within the application script 414 that communicate with the RDBMS on tier-3.

Figure 5:
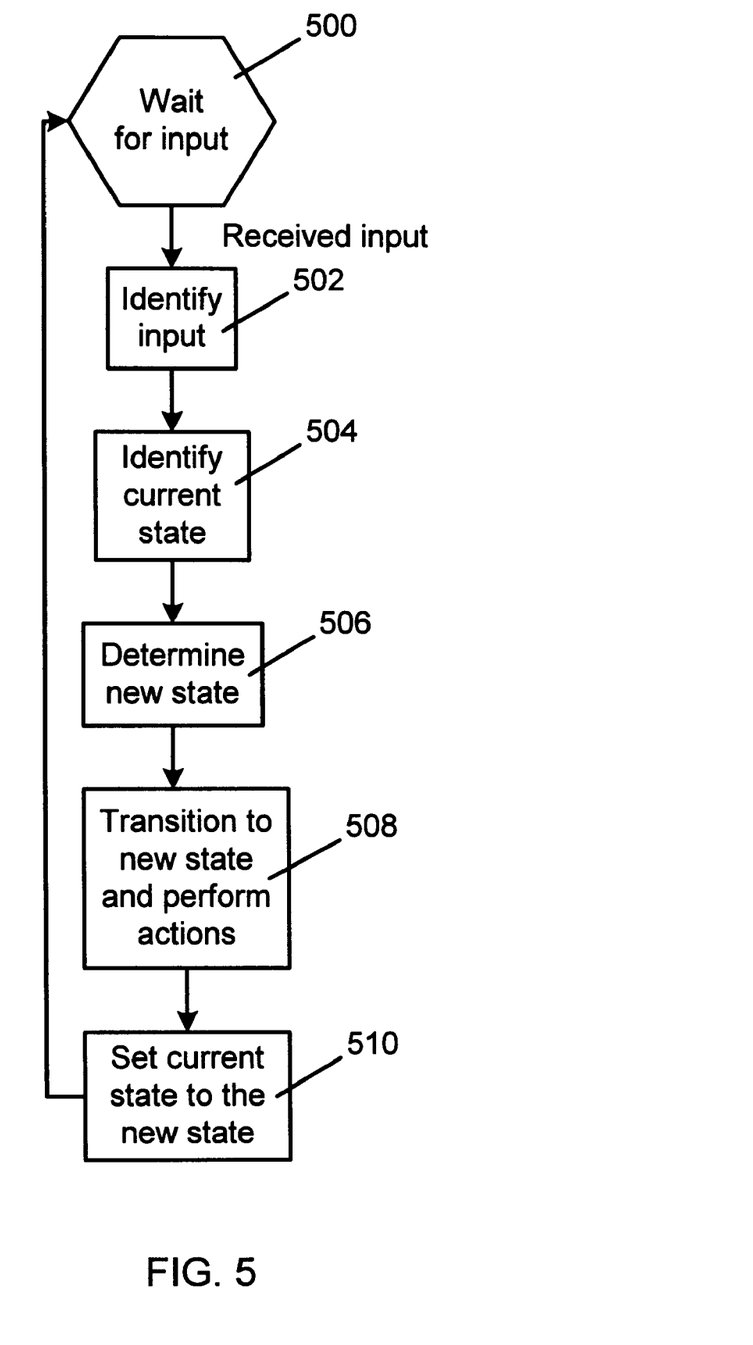
FIG. 5 is a flow chart that illustrates the general logic of the development computer in performing the steps of the present invention, and more specifically, in performing the steps necessary for handling the user interface for the development computer.

FIG. 5 is a flow chart that illustrates the general logic of the development computer 400 in performing the steps of the present invention, and more specifically, in performing the steps necessary for handling the user interface for the development computer 400. In the development computer, operations are performed when transitions are made, based upon input events, from present or current states to new states.

Block 500 represents the development computer 400 waiting for an input event (e.g., a mouse button click). It should be appreciated that during this time, other system tasks, e.g., file, memory, and video tasks, etc., may also be carried out. When an input event occurs, control passes to block 502 to identify the input event. Based upon the input event, as well as the current state of the development computer 400 determined in block 504, a new state is determined in block 506. In block 508, a transition is made to the new state and performs any actions required for the transition. In block 510, the current state is set to the previously determined new state, and control returns to block 500 to wait for more input events.

The specific operations that are performed by block 508 when transitioning between states will vary depending upon the current state and the input event. The various operations required to implement the present invention represent particular events handled by the development computer 400. However, it should be appreciated that these events represent merely a subset of all of the events handled by the development computer 400.

Figure 6A:
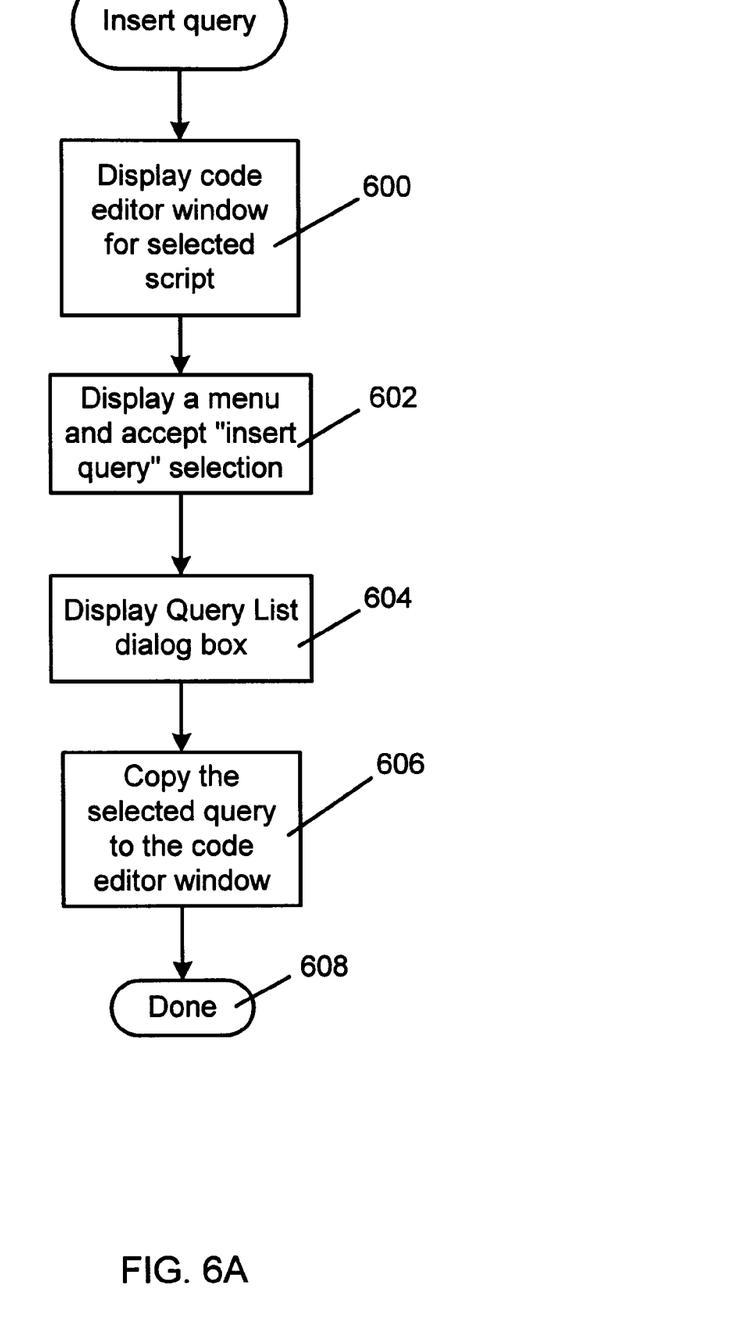
FIG. 6A is a flow chart that illustrates the general logic that implements the "insert query" function according to the present invention.
Figure 6B:
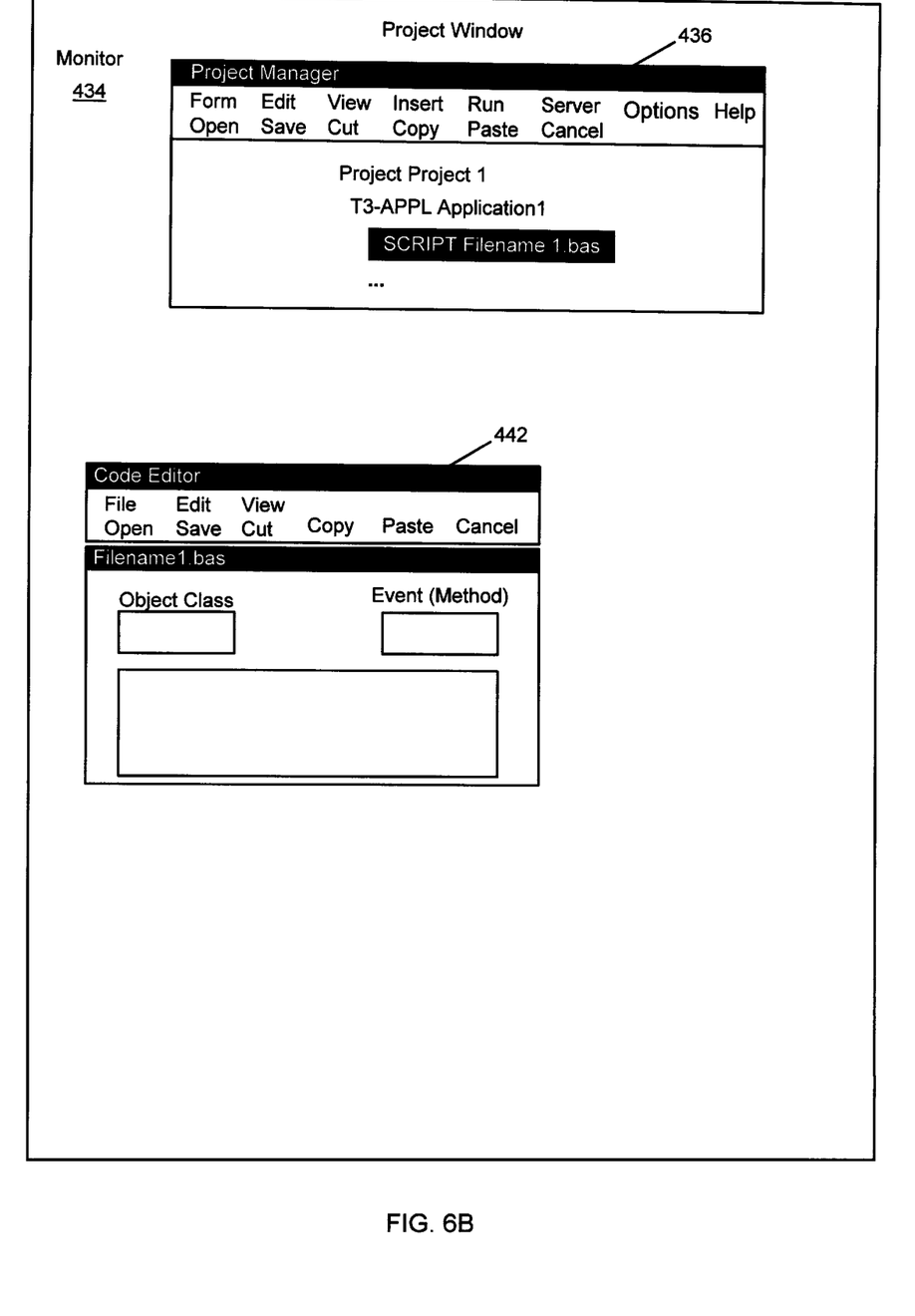
FIGS. 6B, 6C, 6D, and 6E are block diagrams of a computer generated display illustrating the operation of the routine of FIG. 6A.
Figure 6C:
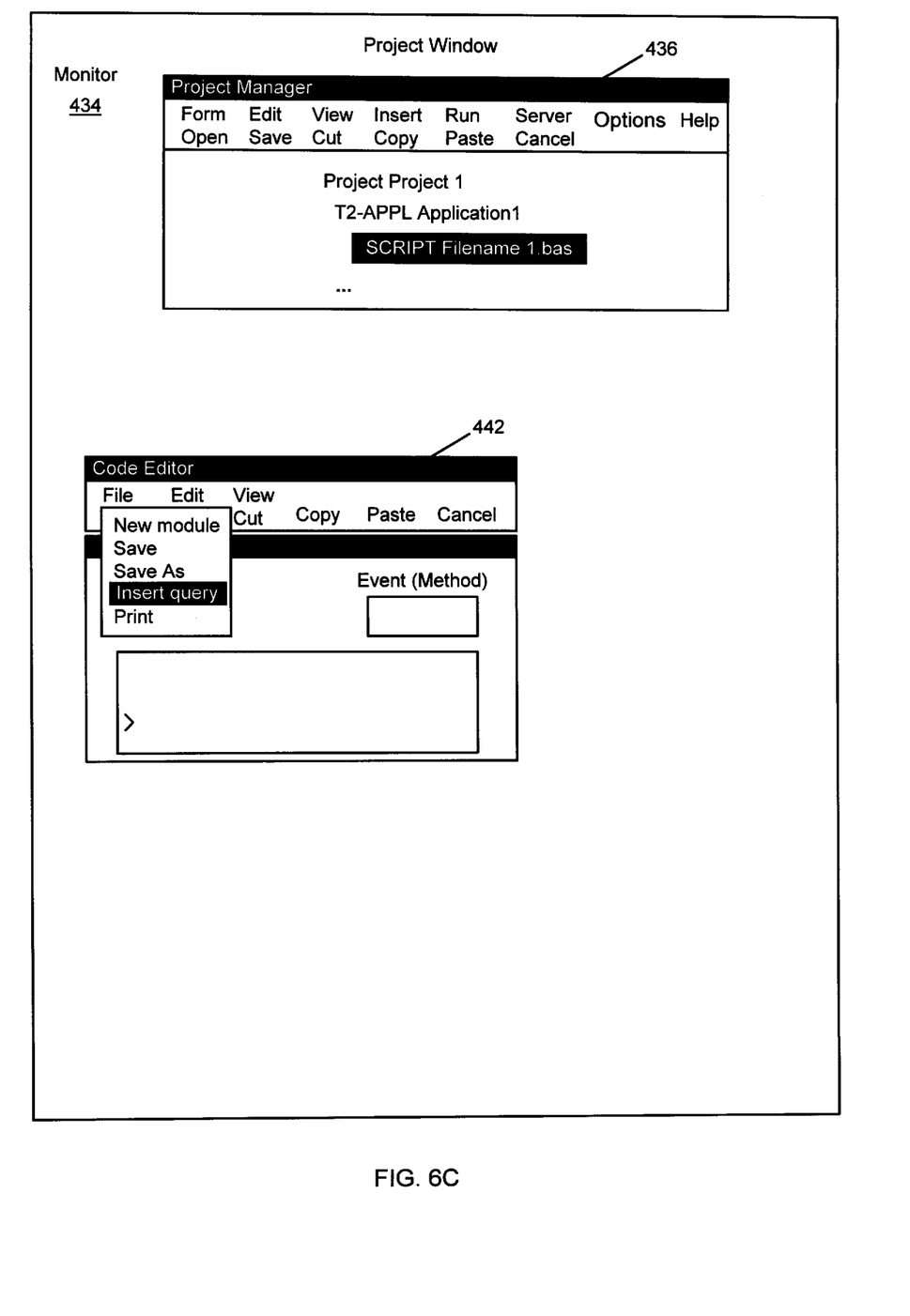
Figure 6D:
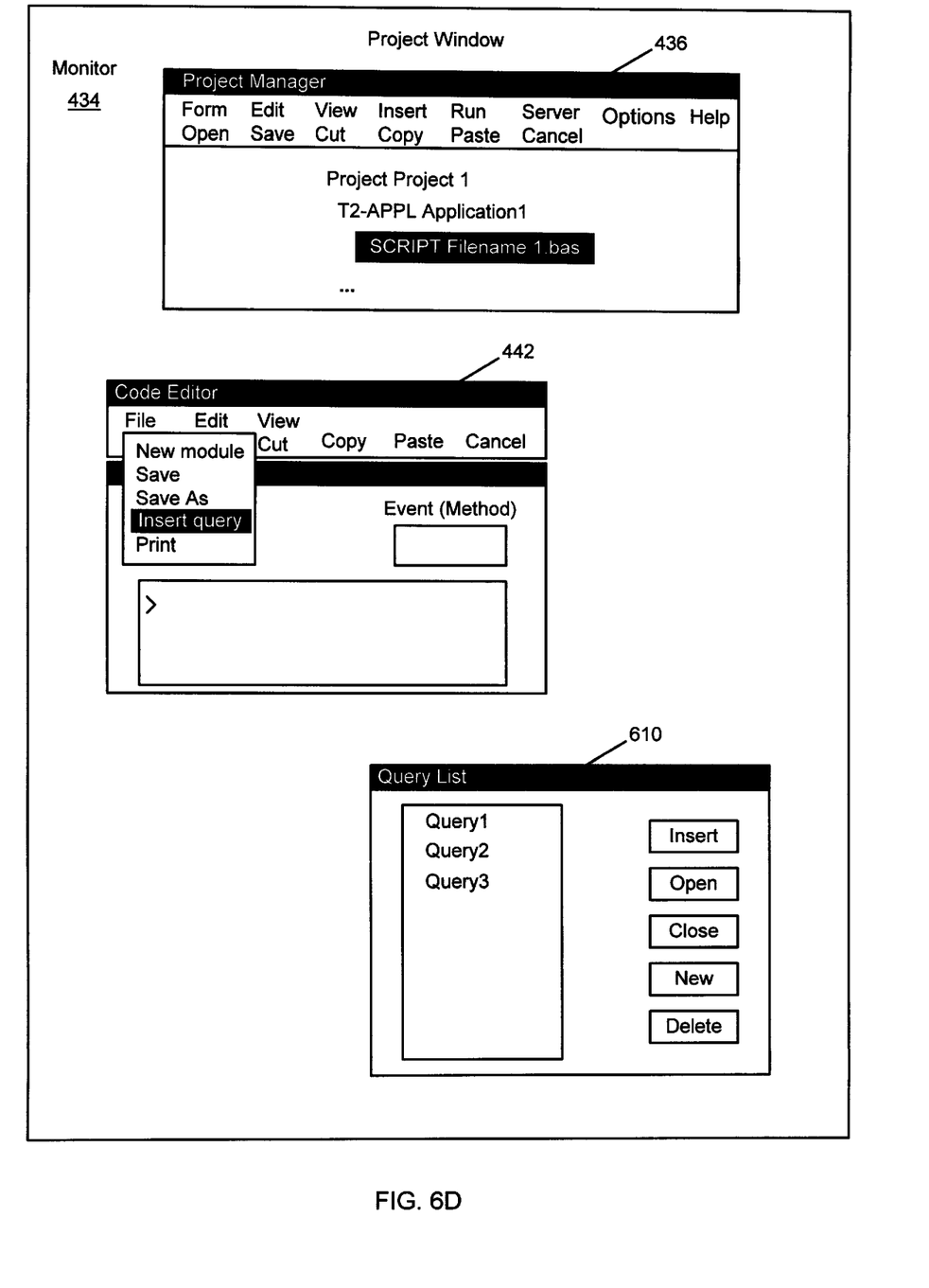
Figure 6E:
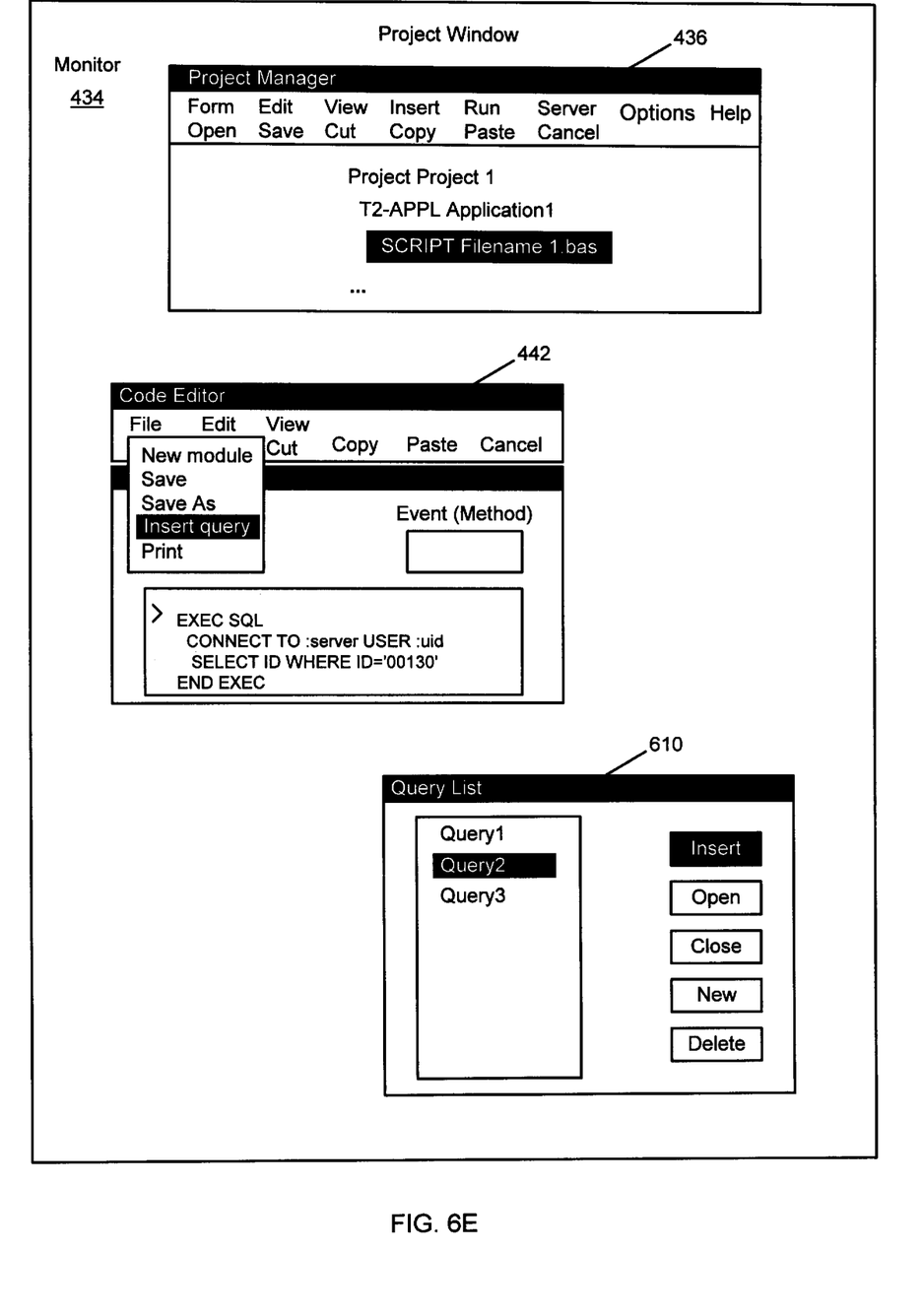

FIG. 6A is a flow chart that illustrates the general logic that implements the "insert query" function according to the present invention. FIGS. 6B, 6C, 6D, and 6E are block diagrams of a computer generated display illustrating the operation of the routine of FIG. 6A, wherein FIG. 6B illustrates the code editor window 412, FIG. 6C illustrates the menu selection "Insert Query" of the code editor window 412, FIG. 6D illustrates the Query List dialog box that is displayed when the "Insert Query" function is selected, and FIG. 6E illustrates the present invention inserting a selected SQL query into the code editor window 412 in response to the selection of the "Insert" function.

In the preferred embodiment, the logic is executed whenever an "Insert Query" function is selected from the code editor window 412 in the development computer 400. The event may occur in response to various user inputs, e.g., by various mouse/keyboard combinations to invoke the function.

Block 600 represents the development computer 400 displaying a code editor window 412 for a selected script in the project window 436, as indicated in FIG. 6B.

Block 602 represents the development computer 400 displaying a menu for the code editor window 412 and accepting user input indicating an "Insert query" menu selection was made, as indicated in FIG. 6C.

Block 604 represents the development computer 400 displaying a Query List dialog box 610 in response to the "Insert query" menu selection from the code editor window 412, as indicated in FIG. 6D. The Query List dialog box 610 displays a list of all known and available SQL queries. A number of functions are available as command buttons in the Query List dialog box 610, including "Insert" (inserts the selected SQL query into the code editor window 412), "Open" (opens the selected SQL query in the SQL Painter window 418 for editing and the like), "Close" (closes the Query List dialog box 610), "New" (creates a new SQL query in the SQL Painter window 418 for editing and the like), and "Delete" (deletes the selected SQL query).

Block 606 represents the development computer 400 copying the selected query to the code editor window 412, as indicated in FIG. 6E. In this example, the query named "Query2" is selected and the "Insert" function is invoked, which results in the contents of "Query2" being inserted into the code editor window 412.

Finally, Block 608 represents the termination of the logic.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for providing a programming development environment that supports the development of Internet and Intranet applications. More specifically, the present invention discloses a mechanism that allows visual selection and insertion of SQL queries into a computer program such as an application script. This results in embedded SQL commands within the application script that communicate with a relational database management system.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of developing a computer program, comprising the steps of:

selecting an application script to be modified, wherein the application script resides on a first server:

displaying a code editor window on a monitor attached to a client, wherein the code editor is used to modify the application script and wherein the client is connected to the first server;

displaying a query list dialog box on the monitor attached to the client, wherein the query list dialog box lists one or more pre-programmed database queries and displays query commands to modify the queries or add additional queries; and selecting one or more of the pre-programmed database queries from the query list dialog box and inserting the code for the pre-programmed database queries into the code editor window, so that the application script modified in the code editor window includes embedded database queries therein that communicate with a database on a second server that is connected to the first server.

2. The method of claim 1 above, wherein the pre-programmed database queries comprise SQL queries.

3. The method of claim 1 above, further comprising the step of opening the selected pre-programmed database query from the query list dialog box for modification.

4. The method of claim 1 above, further comprising the step of creating a new database query.

5. The method of claim 1 above, further comprising the step of deleting one or more of the pre-programmed database queries listed in the query list dialog box.

6. An apparatus for developing a computer program, comprising:

a client having a monitor connected thereto;

means, performed by the client, for selecting an application script to be modified, wherein the application script resides on a first server connected to the client;

means, performed by the client, for displaying a code editor window on a monitor attached to the client, wherein the code editor is used to modify the application script;

means, performed by the client, for displaying a query list dialog box on the monitor attached to the client, wherein the query list dialog box lists one or more pre-programmed database queries and displays query commands to modify the queries or add additional queries; and means, performed by the client, for selecting one or more of the pre-programmed database queries from the query list dialog box and inserting the code for the pre-programmed database queries into the code editor window, so that the application script modified in the code editor window includes embedded database queries therein that communicate with a database on a second server that is connected to the first server.

7. The apparatus of claim 6 above, wherein the pre-programmed database queries comprise SQL queries.

8. The apparatus of claim 6 above, further comprising the step of opening the selected pre-programmed database query from the query list dialog box for modification.

9. The apparatus of claim 6 above, further comprising the step of creating a new database query.

10. The apparatus of claim 6 above, further comprising the step of deleting one or more of the pre-programmed database queries listed in the query list dialog box.

11. An article of manufacture comprising a program storage medium readable by a computer and embodying one or more instructions executable by the computer to perform method steps for developing a computer program, the method comprising the steps of:

selecting an application script to be modified, wherein the application script resides on a first server:

displaying a code editor window on a monitor attached to a client, wherein the code editor is used to modify the application script and wherein the client is connected to the first server;

displaying a query list dialog box on the monitor attached to the client, wherein the query list dialog box lists one or more pre-programmed database queries and displays query commands to modify the queries or add additional queries; and selecting one or more of the pre-programmed database queries from the query list dialog box and inserting code for the pre-programmed database queries into the code editor window, so that the application script modified in the code editor window includes embedded database queries therein that communicate with a database on a second server that is connected to the first server.

12. The method of claim 11 above, wherein the pre-programmed database queries comprise SQL queries.

13. The method of claim 11 above, further comprising the step of opening the selected pre-programmed database query from the query list dialog box for modification.

14. The method of claim 11 above, further comprising the step of creating a new database query.

15. The method of claim 11 above, further comprising the step of deleting one or more of the pre-programmed database queries listed in the query list dialog box.

* * * * *